Figure 1:
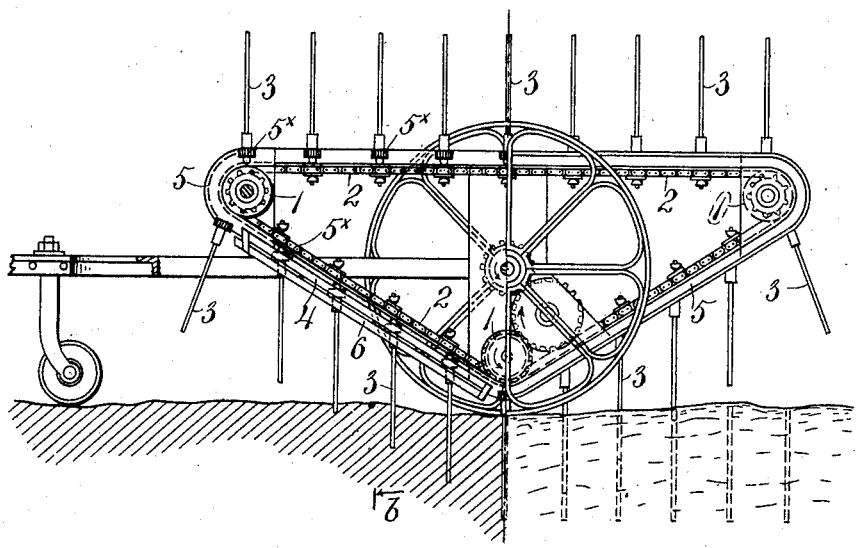
Figure 1:
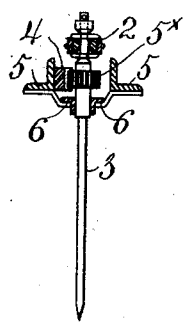
Figure 1:
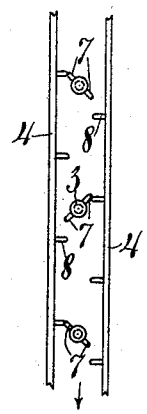
Figure 1:
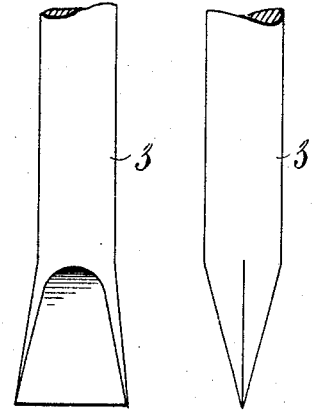

P. LOCHTIN.
CULTIVATOR.
APPLICATION FILED OCT. 11, 1906.

908,874.

Patented Jan. 5, 1909.

Witnesses
W. E. Allen
Charles Lowell Howard

Inventor
Peter Lochtin
By Knight Bros.
Attorneys

UNITED STATES PATENT OFFICE.

PETER LOCHTIN, OF ALEXANDROW, NEAR MOSCOW, RUSSIA.

CULTIVATOR.

No. 908,874.　　　　　Specification of Letters Patent.　　　　Patented Jan. 5, 1909.

Application filed October 11, 1906. Serial No. 338,413.

*To all whom it may concern:*

Be it known that I, PETER LOCHTIN, of Alexandrow, Russia, a subject of the Emperor of Russia, and whose post-office address is Alexandrow, near Moscow, have invented new and useful Improvements in Cultivators, of which the following is a specification.

The present invention relates to an improved means for cultivating the ground and apparatus therefor and an important object is to make the deeper parts of the ground available for the roots of plants growing therein.

The usual methods of working the ground effect only a shallow breaking-up of the soil; they do not prevent the loosened heavy soil, for example, clay soil, running together after a heavy fall of rain and drying later to a hard mass. As the ground under the surface soil is in most cases firm, the roots of the plants have hard work to penetrate into the ground and cannot go far into the subsoil. In this manner recourse has usually been had for the growth of plants to a thin layer of soil (about 5 to 25 centimeters thick).

The cultivators in accordance with the present invention have as an important object the making of the stores of food and water in the subsoil as far as possible accessible to the plants, whereby a depth can be attained or is to be attained which exceeds the depth of the surface soil by two, three and fourfold and perhaps still more. But for the land which has frequently only porous earth over a layer five to ten centimeters thick on firm subsoil, the layer of soil accessible to the roots can be increased from five to tenfold.

The cultivators in accordance with the present invention are stationary and movable apparatus and machines which make cavities (holes or cuts) in the ground which go to the depth of 20 to 100 and more centimeters. They accomplish this work by means of rotating (boring), semi-rotating (to and fro), stationary, vibrating or cutting thin rods or knives and the like. The interval of the separate holes or cuts from one another for plants close together, such as grain and grasses etc., may amount to five, ten, fifteen, twenty centimeters and more, according to the species of plant and method of sowing etc.

The cultivators according to the present invention make holes or cuts the sides of which are compressed. The earth (clay, loam, marl etc.) cannot run firmly or closely together in these tubular or narrow flat spaces, on account of the frictional resistance of the sides. The cavities form places for storing rain water and offer places which are easily penetrable for the roots of the plants which are richly provided with water and means of nourishment. Also when there is a scarcity of rain these cavities will be exceedingly useful for the plants, as they open to them the layers of the ground containing much water. The cultivator may be taken before the plow or the harrow over the land under cultivation. The compression of the sides of the cavities give reason for supposing (and trials confirm this supposition), that the beneficial effect of the cultivators will be manifested also in the second, third, and probably still later years, especially in heavy ground, all the more as the roots penetrating into the cavities which remain there and after decaying will give new roots the possibility of penetrating deeply into the ground. If the ground is worked for some time annually with the cultivator, a layer of the ground about one meter thick will be likewise gradually made accessible to the plants, as is the present surface soil.

With reference to the manner of working the cultivators for different plants, two cases may be differentiated. Firstly, there are plants, such as grasses and all kinds of corn, the roots of which spread out to all sides. For such plants it is not necessary to place the seed on the places where the cavities are situated; the roots of the plants will themselves find the same. Secondly, there are plants, such as turnips, parsley, etc. the roots of which penetrate vertically into the earth. For these plants it is necessary to place the seed as exactly as possible over the cavities. In the case of plants with vertical roots, the latter receive the form of oblique cones (or balls) on account of the increasing closeness of the ground. The cause of the heads of turnips (and potatoes) projecting from the earth is very probably also to be found in this circumstance. If enlarged cavities are made in the upper part of the ground for these plants, the roots pass at once to the more cylindrical shape. Accordingly it appears advantageous to make the cavities of the ground wider above for these plants.

The land is radically improved by the cultivators in accordance with the present invention, without changing the upper surface. It is also advantageous to work the cultivator on deep porous or loose soil. The plants are grateful for every alleviation of the work to be done by their roots. It is found that cultivators effect a much quicker ripening of the plants, besides an increase of the harvest.

More particularly the present invention consists in an improved means for cultivating the ground and an improved apparatus for carrying the same into effect, and in order that the details of construction and action of the invention may be more clearly understood, reference is made to the accompanying drawing in which one form of the cultivator is given by way of example, and in which:

Figure 1 is an elevation partly in section; Fig. 2 is a sectional elevation on the line $a$—$b$ in Fig. 1 taken on a larger scale and showing means for rotating the cultivator-rods; Fig. 3 is a plan view of a modified constructional form showing a device for giving a semi-rotation to the cultivator-rods; Fig. 4 shows a side and end elevation of part of one cultivator-rod on a still larger scale.

Similar reference numerals refer to similar parts in all views.

The machine consists of a row of rods 3, which are mounted on an endless chain 2 so as to project therefrom in a vertical plane. This endless chain runs over three pulleys 1 and is carried by a frame 5. The whole frame is arranged so that it can travel. A transmission of motion from the wheels is provided by which the chain runs continuously round the pulleys, and with such a speed that the rods have no progressive motion with respect to the ground, that is to say, they remain stationary relatively to the ground. Further, a fixed rail 4 is arranged on the traveling frame. This rail serves for setting the rods in a rotating or to and from motion.

In Fig. 2 the arrangement for the rotating motion is shown in detail. The toothed wheel $5^\times$ is arranged on the rods 3, which wheel engages in the rack 4, and the rods, being now moved relatively to the rack, are rotated. An immovable rail 6 serves for maintaining the rod in the proper direction.

In Fig. 3 is shown a part of modified construction with a device for obtaining a semi-rotational motion of the rods. The fixed rail 4 is made double in this case, and is provided with studs or wedge-shaped projections 8. Cross-bars 7 on the rods 3 hit the projections 8 when said rods are moved longitudinally and thereby set the rod itself in a rotationally vibrating motion. Lastly it may be pointed out that the rods are with advantage formed chisel or knife-shaped, as Fig. 4 shows, the lower part being somewhat broader than the rod itself. It is thereby attained that the frictional resistances are avoided in the boring of the cavities.

While I have described in the foregoing specification the construction of parts and operations preferred I am aware that numerous changes of construction and operation may be made without departing from the spirit and scope of my invention, and I therefore do not wish to be understood as limiting myself by the positive terms employed in connection with the description, excepting such as the state of the art may require.

What I claim, and desire to secure by Letters Patent of the United States, is:—

1. An apparatus for cultivating the ground comprising a carriage, an endless chain carried thereby and revolving in a vertical plane a series of boring tools mounted on said chain, projecting vertically therefrom in position to be forced into the ground by the movement of the machine and means for rotating said boring tools while entering the ground.

2. In an apparatus for cultivating the ground the combination of a suitable carriage, an endless chain carried thereby, carrying and driving pulleys for said endless chain, by which it is guided in a vertical plane and in position inclining downward from front and back on its under side, a series of boring tools mounted rotatably in said endless chain and projecting vertically from the under side thereof in position to be forced into the ground and withdrawn therefrom by the forward motion of the machine, and means for imparting rotary motion to the said boring tools while entering the ground.

3. In an apparatus for cultivating the ground the combination of a suitable carriage, an endless chain carried thereby, carrying and driving pulleys for said endless chain, by which it is guided in a vertical plane and in position inclining downward from front and back on its under side, a series of boring tools mounted rotatably in said endless chain and projecting vertically from the under side thereof in position to be forced into the ground and withdrawn therefrom by the forward motion of the machine, and means for imparting reciprocating rotary motion to the said boring tools while entering the ground, substantially as described.

In testimony whereof I have hereunto set my hand in presence of two subscribing witnesses.

PETER LOCHTIN.

Witnesses:
  GURHARD HARTING,
  PHILIPP LEVISSOHN.